US012468089B2

(12) United States Patent
Huang et al.

(10) Patent No.: US 12,468,089 B2
(45) Date of Patent: Nov. 11, 2025

(54) APPARATUS AND METHOD FOR LOW LATENCY FREE-SPACE OPTICAL COMMUNICATIONS

(71) Applicant: Panduit Corp., Tinley Park, IL (US)

(72) Inventors: Yu Huang, Orland Park, IL (US); Richard J. Pimpinella, Prairieville, LA (US); Jose M. Castro, Naperville, IL (US); Bulent Kose, Burr Ridge, IL (US)

(73) Assignee: Panduit Corp., Tinley Park, IL (US)

( * ) Notice: Subject to any disclaimer, the term of this patent is extended or adjusted under 35 U.S.C. 154(b) by 244 days.

(21) Appl. No.: 17/955,676

(22) Filed: Sep. 29, 2022

(65) Prior Publication Data

US 2024/0118493 A1 Apr. 11, 2024

(51) Int. Cl.
   *G02B 6/26* (2006.01)
   *G02B 6/02* (2006.01)
   *G02B 6/32* (2006.01)
   *H04B 10/11* (2013.01)

(52) U.S. Cl.
   CPC ........ *G02B 6/262* (2013.01); *G02B 6/02042* (2013.01); *G02B 6/32* (2013.01); *H04B 10/11* (2013.01)

(58) Field of Classification Search
   CPC ...... G02B 6/02042; G02B 6/262; G02B 6/32; H04B 10/11
   See application file for complete search history.

(56) References Cited

U.S. PATENT DOCUMENTS

| | | | |
|---|---|---|---|
| 6,208,784 B1 * | 3/2001 | Glen | G02B 6/2817 385/39 |
| 6,600,767 B1 | 7/2003 | Lefevre | |
| 7,218,811 B2 * | 5/2007 | Shigenaga | G02B 6/32 385/39 |
| 10,234,632 B1 | 3/2019 | Keeler et al. | |
| 10,352,110 B2 * | 7/2019 | Olin | E21B 17/1035 |
| 11,199,668 B1 * | 12/2021 | Schlepple | G02B 6/02042 |
| 2013/0088771 A1 | 4/2013 | Li et al. | |
| 2015/0168642 A1 | 6/2015 | Mimura et al. | |
| 2018/0359024 A1 | 12/2018 | Oda et al. | |
| 2019/0379175 A1 | 12/2019 | Shimakawa et al. | |
| 2020/0310047 A1 | 10/2020 | Austin et al. | |
| 2021/0026075 A1 | 1/2021 | Arao | |
| 2021/0389525 A1 | 12/2021 | Yamada et al. | |
| 2021/0399514 A1 | 12/2021 | Takeshita et al. | |
| 2023/0393354 A1 * | 12/2023 | Pimpinella | G02B 6/02304 |

FOREIGN PATENT DOCUMENTS

| | | |
|---|---|---|
| WO | 2012088361 A2 | 6/2012 |
| WO | 2018181132 A1 | 10/2018 |
| WO | 2021245774 A1 | 12/2021 |

* cited by examiner

*Primary Examiner* — Daniel Petkovsek
(74) *Attorney, Agent, or Firm* — Christopher K. Marlow; Christopher S. Clancy; James H. Williams

(57) ABSTRACT

A low latency free-space optical data communication channel has at least two opposing optical collimators for transmitting an optical communication signal in the form of a parallel beam across a free-space channel. The input of the collimators are multi-core optical fibers. Multiple cores of the multi-core optical fibers are positioned at the focal point of the two opposing optical collimators. The optical collimators image the communications signals in each of the cores of the multi-core fibers into the corresponding cores of the opposing multi-core fibers.

2 Claims, 13 Drawing Sheets

APPARATUS AND METHOD FOR LOW LATENCY FREE-SPACE OPTICAL COMMUNICATIONS

FIELD OF INVENTION

The present invention generally relates to the field of high-speed optical fiber communication channels and, more specifically, to a low latency optical channel. The disclosed apparatus and method enables optical communication signals to propagate through free-space, thereby traveling at the speed of light in air minimizing propagation time. The disclosed apparatus and method provides low latency optical signal paths for a multiplicity of discrete channels equalizing the propagation delay between adjacent channels.

BACKGROUND

Free-space optical communications (in various forms) has been used for thousands of years. The ancient Greeks used a coded alphabetic system of signals to communicate utilizing torches. In 1880, Alexander Graham Bell created the photophone, which he considered his most important invention and was the world's first wireless telephone. Bell demonstrated voice communications over free-space optics between two building some 213 meters apart. During the trench warfare of World War I, red filtered light signals provided undetected communications at night. Currently, free-space optical communications is widely used in commercial, military, and space applications.

Today, large data centers utilize optical fiber communications to achieve the high-speed and long channel reaches required for the switch-to-switch and switch-to-server interconnections. In the field of high-speed trading in financial markets, traders demand minimum transaction delay and guaranteed equivalent optical signal delay compared to other traders. Presently, these high-speed transactions propagate over standard single-mode and/or multimode optical fibers. To guarantee equivalent trading delays, optical fiber cable assemblies are custom manufactured where the discrete fiber lengths within said cable are precisely measured using optical time domain reflectometers (OTDRs) to ensure the optical channel delays are equivalent.

To reduce the propagation delay of the optical channel, fiber manufacturers are developing hollow core fibers, where the core is a channel of air surrounded by an array of hollow tubes which form reflective micro-structures cladding, to confine the optical beam, FIG. 1. However, these fiber types are extremely difficult to manufacture in high volume and hence, are extremely expensive, i.e., hundreds to thousands of dollars per meter. Hollow core fibers also exhibit high attenuation (insertion loss) due to the coupling of the light's electromagnetic fields with the surrounding fiber core structure. In addition, due to the highly controlled spacing between fiber core elements, these fiber types and are very fragile and susceptible of degradation in performance as a result of bending. Consequently, hollow core fibers must have a robust cable design, and have a large bend radius not to deform or damage the core structure.

Hence, there is a need for a low cost solution where, the optical signal propagates near that of the speed of light in vacuum so that channels of said communication signals undergo minimum delay, and traders can be guaranteed equivalent optical channel paths.

The speed of an optical signal is determined by the refractive index of the medium in which it propagates, where the refractive index is effectively the optical dielectric constant of the medium. The refractive index, n, is defined by, $$n = \frac{c}{v} \quad [1]$$

where, c is the speed of light in vacuum (299,792,458 m/s), and v is the speed of the optical signal in the medium. In general, the refractive index of glass, as used in optical fibers is about 1.467. Hence, the speed of light in optical fiber is 204,357,504 m/s, or 68% of the maximum speed of light in vacuum. Given a typical channel length of 75 m, the time of flight in vacuum is 250 ns. For light propagating through glass optical fiber, the time of flight for a 75 m channel is 367 ns, introducing a delay of 117 ns, or 0.117 μs. For high-speed trading, this is not acceptable.

The authors of this disclosure measured the refractive index, and hence the optical signal delay in a commercially available hollow core fiber (hcf). The refractive index was found to be $n_{hcf}$=1.000476, yielding a 0.0476% delay compared to vacuum.

In FIG. 2, we show an image of an exposed endface of said tested hollow core fiber 100, where the optical signal propagates as a fundamental mode within the central hollow core region, 101 (air), and the six features 102 which serve to optimize the optical performance of the hollow core fiber.

SUMMARY

A low latency free-space optical data communication channel has at least two opposing optical collimators for transmitting an optical communication signal in the form of a parallel beam across a free-space channel. The input of the collimators are multi-core optical fibers. Multiple cores of the multi-core optical fibers are positioned at the focal point of the two opposing optical collimators. The optical collimators image the communications signals in each of the cores of the multi-core fibers into the corresponding cores of the opposing multi-core fibers.

DESCRIPTION OF THE INVENTION

Figure 3:
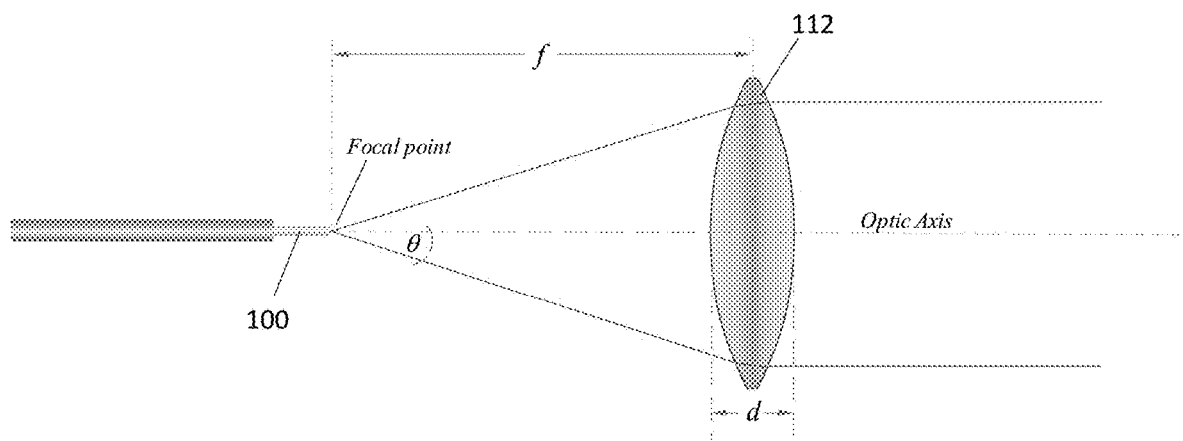
FIG. 3 illustrates the optical components of the apparatus and method according to the present invention.
Figure 4:
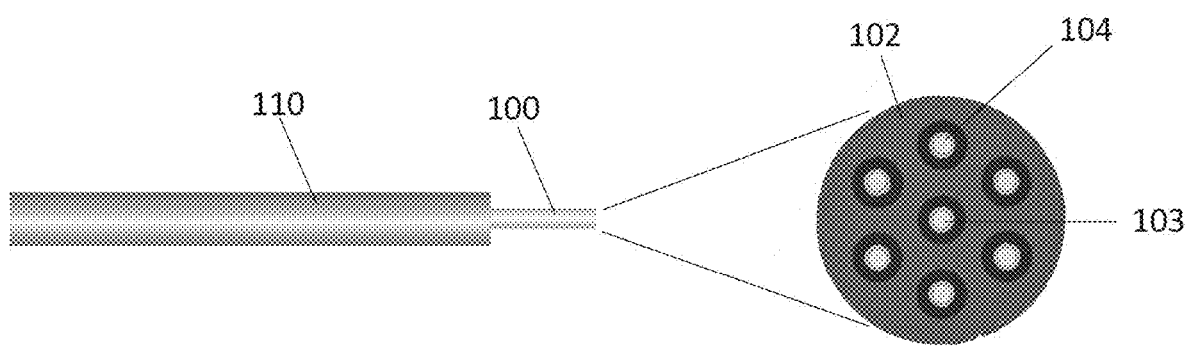
FIG. 4 illustrates a fiber with multiple single-mode cores according to the present invention.

In the present invention, we disclose apparatus and method for free-space optical communication channels to be used in high speed low latency applications, where the channels do not have to utilize expensive hollow core fibers. Free-space optical communications requires three necessary conditions; line-of-sight, an unobstructed optical path, i.e., channel, and the divergence of the optical beam must be minimized. In FIG. 3, we illustrate the optical components of the apparatus and method according to the present invention, where fiber 100 is a multi-core optical fiber, FIG. 4.

Optical fiber 100 is shown with a typical protective acrylic coating 110. However, the fiber according to the present invention contains multiple single-mode cores within the standard 125 micron outer diameter, referred to as a multi-core fiber. In this case, the fiber end face 102 reveals 7 discrete cores, a central core 103, surrounded by 6 cores 104 in a hexagonal configuration, FIG. 4.

Figure 5:
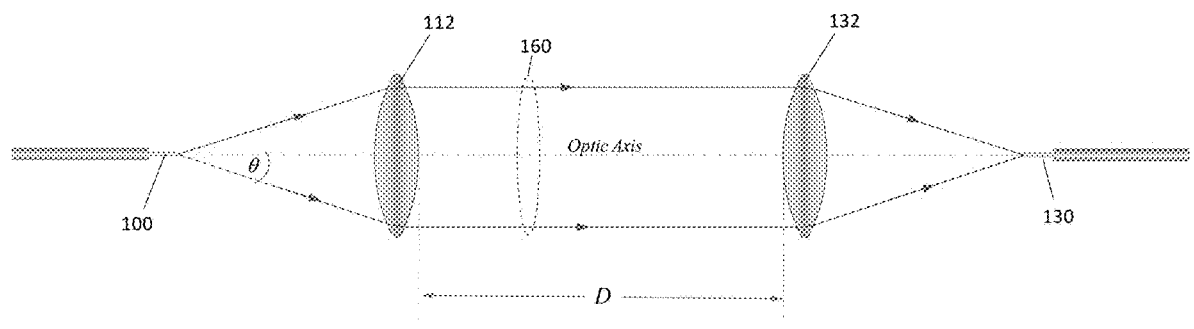
FIG. 5 further illustrates the concept of FIG. 3 in order to make an optical channel according to the present invention.

For this fiber core configuration, we can utilize core 103 for optical alignment functions while the remaining cores can be used to support 3 duplex optical communication channels. The optical channel is shown in FIG. 5.

A transmitted optical communications signals emitted from the output end face of optical fiber 100, diverges at an angle θ, defined by the fiber's numerical aperture (NA). In order to transmit the optical signal over a given distance, the light beam must be collimated in order to minimize the signal divergence and thereby, the channel insertion loss, and provide a signal amplitude high enough for the receiver to detect an error free signal. This is achieved by placing an optical fiber 100 at the focal point 101 of lens 112.

The multiple optical communication signals emanating from the 7 discrete Cores of fiber 100, positioned at the focal point of lens 112 produced a collimated beam 160. The optical beam impinges on receiving lens 132 and the transmitting cores are imaged onto the corresponding cores in fiber 130 resulting in 3 duplex free-space optical communication channels.

Figure 6:
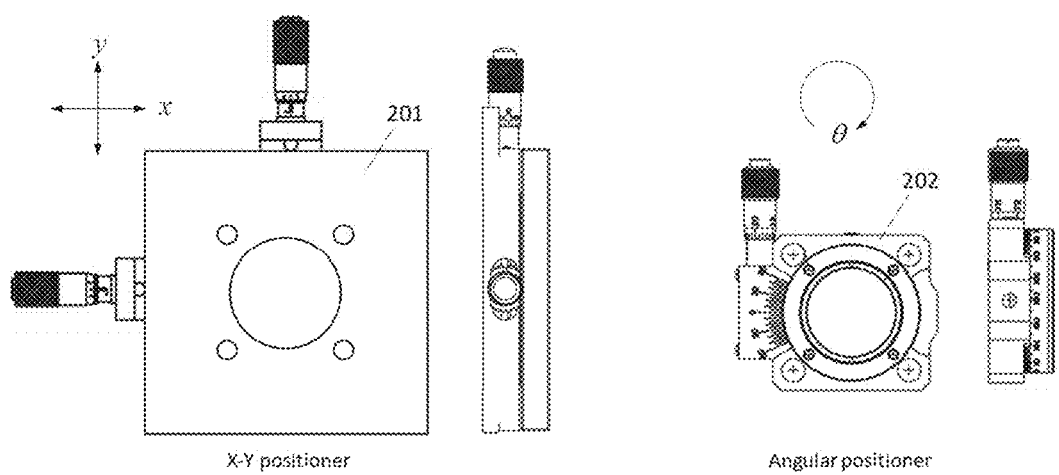
FIG. 6 shows optical positioners, which can be used with the present invention.

In order to align said optical fibers 100 and 130 to lenses 112 and 132 respectively, optical positioners are utilized. In FIG. 6 we show typical optical positioners, which can be utilized to perform the necessary alignment of the disclosed optical system.

Figure 7:
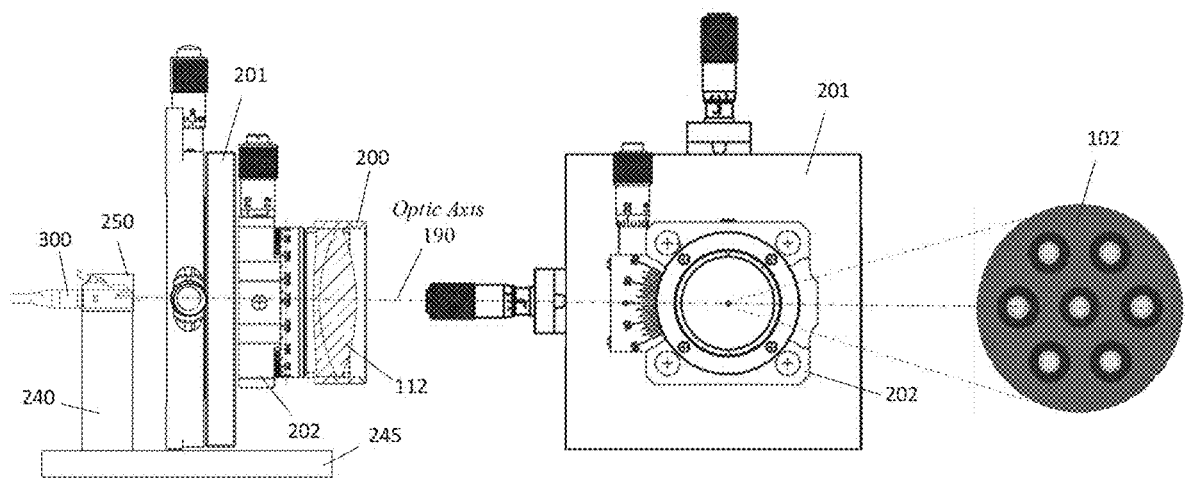
FIG. 7 shows a first embodiment of the present invention.

Liner positioner 201 provides controlled displacements in the lateral x-y directions perpendicular to the optic axis, whereas positioner 202 provides rotational displacements around the optic axis defined by the central cores 103 of multi-core fibers 100 and 130. In this scenario, rotational alignment is required to position the 6 cores surrounding 103. In FIG. 7, we show one embodiment of the present invention. Lens 112 is mounted in lens assembly 200, mounted on positioner 202, and centered on the optic axis.

Figure 8:
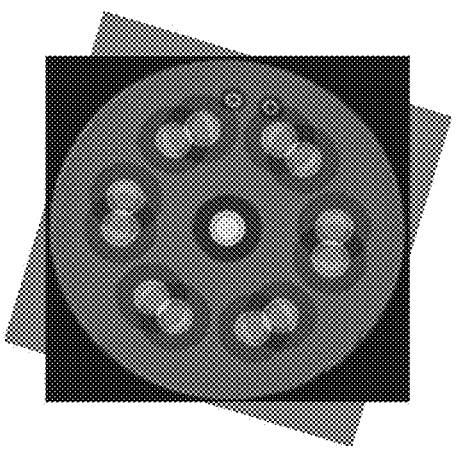
FIG. 8 illustrates the importance of rotational alignment.

As illustrated in FIG. 8, it is insufficient to only align the central core. A rotational alignment is required to align the surrounding cores. This can be achieved by utilizing one more pair of mating cores to monitored and adjust the angular positioner 202 to align the radially offset cores. One exemplary method to adjust the angular rotation is to add two 90:10 1×2 fiber splitters to two of the fanned out cores to monitor the power for alignment. In this way, all the 7 channels can still be used for data center communication.

Figure 9:
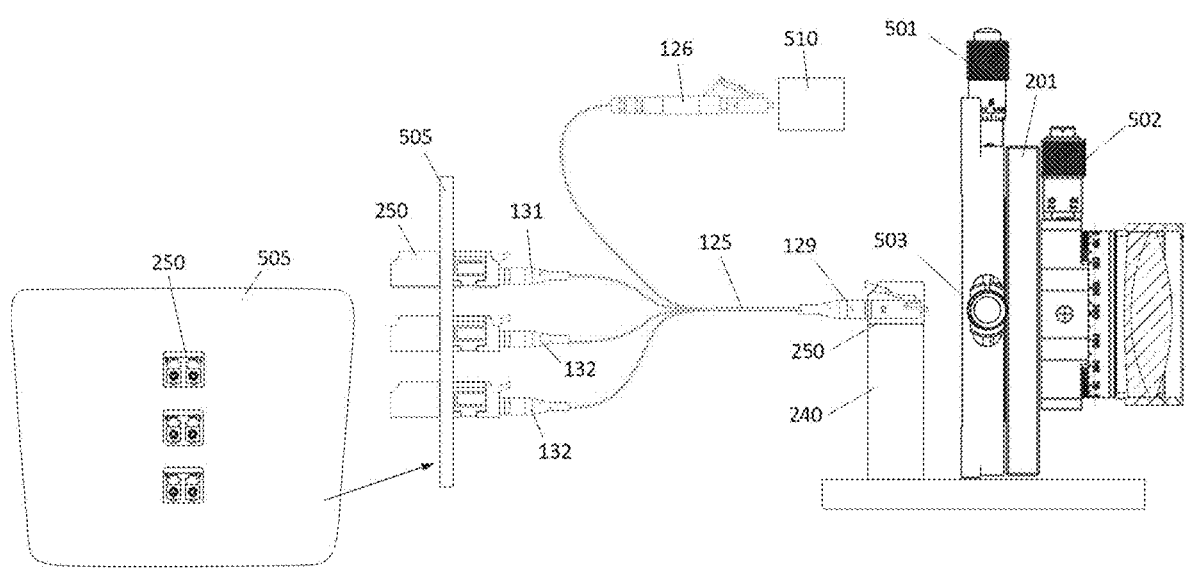
FIG. 9 shows how a fiber core breakout cable can be used with the present invention.

Access to the discrete cores 103 and 104 in said multi-core optical fibers 100 and 130 is achieved by means of a fiber core breakout cable 125, FIG. 9. Utilizing a specialized manufacturing process, the discrete cores are broken out into (in this example) 1 simplex LC 126 connecting to core 103, while cores 104 are terminated in 6 LC connectors grouped into 3 duplex core pairs 131, 132, and 133, for duplex communications. The multi-core fiber 100 can be terminated in a standard LC connector 129, held in position by means of an LC adapter 250 rigidly held in place by 240. The central fiber core 103 terminated in LC 129, is aligned on the optic axis at the focal point.

Figure 10:
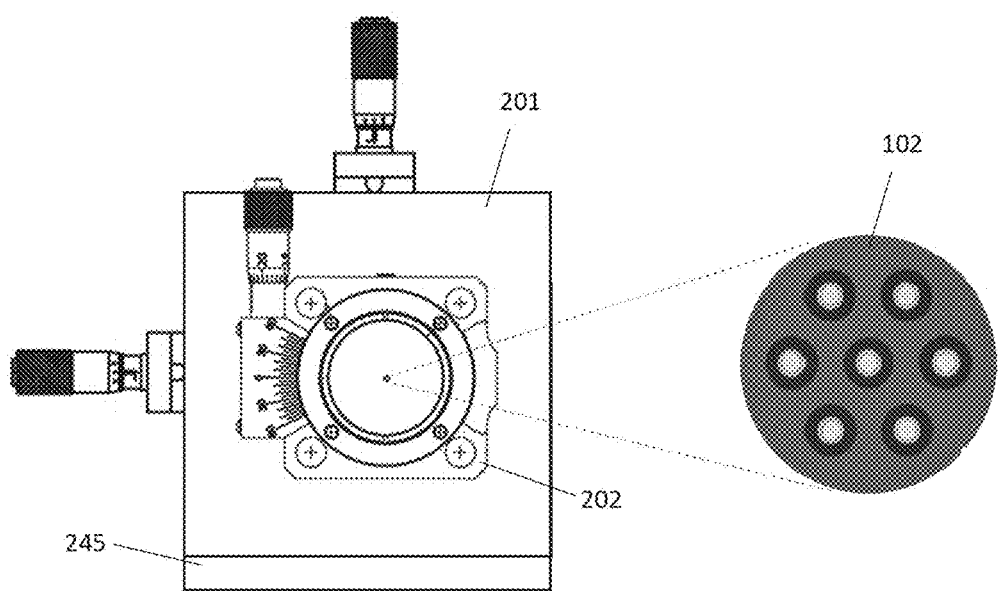
FIG. 10 shows the positional relationship between the alignment stages and multi-core optical fiber.
Figure 11:
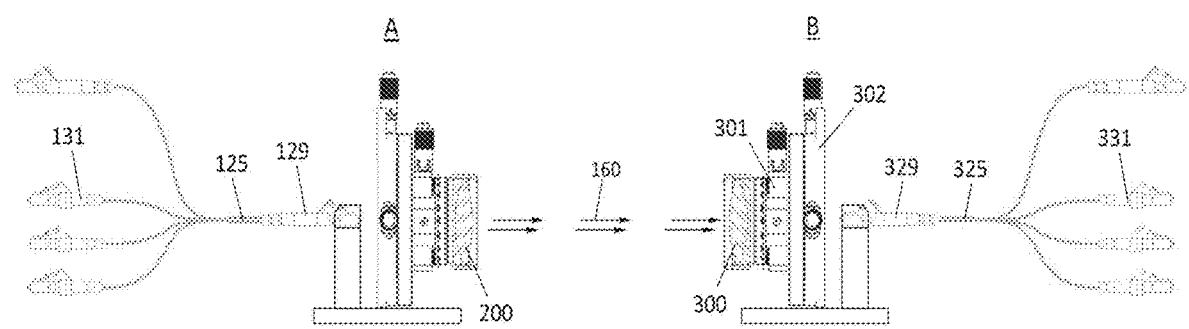
FIG. 11 traces the path of a nominal optical communication signal according to the present invention.

FIG. 10 shows the positional relationship between the alignment stages and multi-core optical fiber. The basic optical system in accordance to the present invention is illustrated in FIG. 11. As an example, referring to FIG. 11 we trace the path of a nominal optical communication signal. An optical communication signal transported in a single-mode fiber is coupled into the free-space apparatus according to the present invention via duplex connector 131. The signal is coupled into one of the cores of a multi-core optical fiber 125, held in position and aligned to the optic axis by means of apparatus A. The signal emanates from the output of connector 129, positioned at the focal point of lens 200. The essentially parallel optical beam traverses the free-space region between apparatus A and apparatus B. The signal is imaged by means of lens 300 into the end face of a corresponding core of said multi-core fiber terminated in receiving connector 329. The signal is then routed to connector 331, forming a communication channel.

Alternatively, one of the external cores 104 can be used for channel monitoring and alignment and connected to LC 126, while cores 103 and rest of 104 core in 3 LC duplex connectors 131, 132 133. The latter arrangement can improve the angular alignment of the system.

Figure 12:
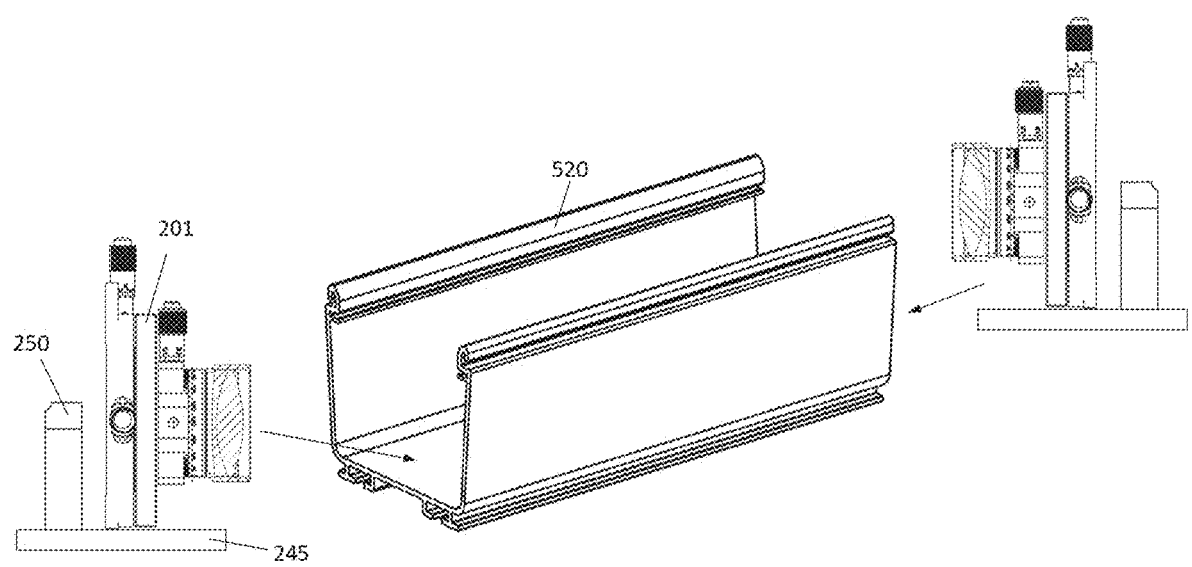
FIG. 12 shows how a channel raceway can be sued to contain the collimated light path.

To protect and enclose the low latency free-space optical channel for communication applications according to the present invention, the collimated light path is enclosed within a channel raceway 520 as those commonly used to carry fiber optic cables, FIG. 12. The use of commercial data center raceways provides all the necessary hardware, installation practices, and industry certifications for safe use. In the preferred implementation, raceway 520 is a polymer material, enclosed with lid, and two end caps, not shown.

Figure 1:
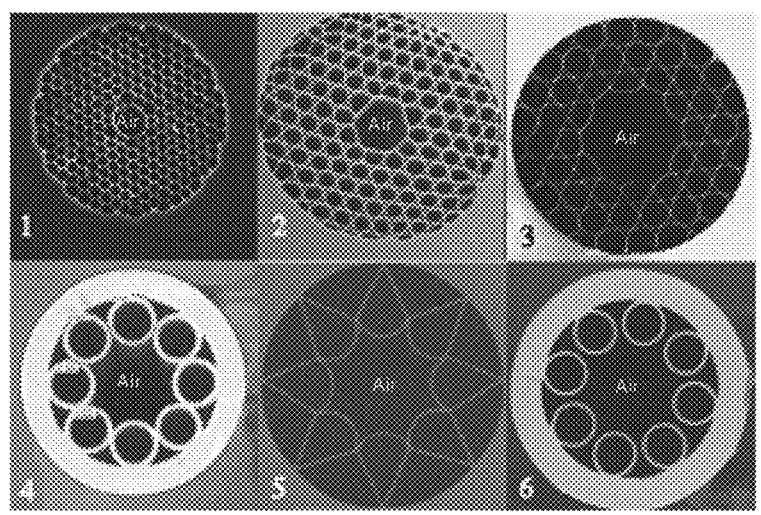
FIG. 1 shows cross-sectional views of various hollow core optical fibers.
Figure 2:
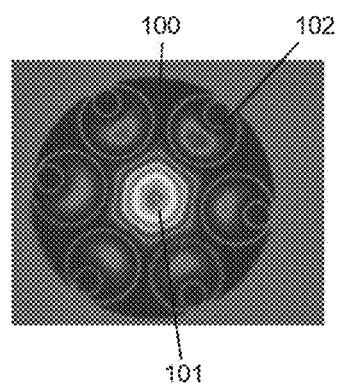
FIG. 2 shows an image of an exposed endface of a tested hollow core fiber.
Figure 13:
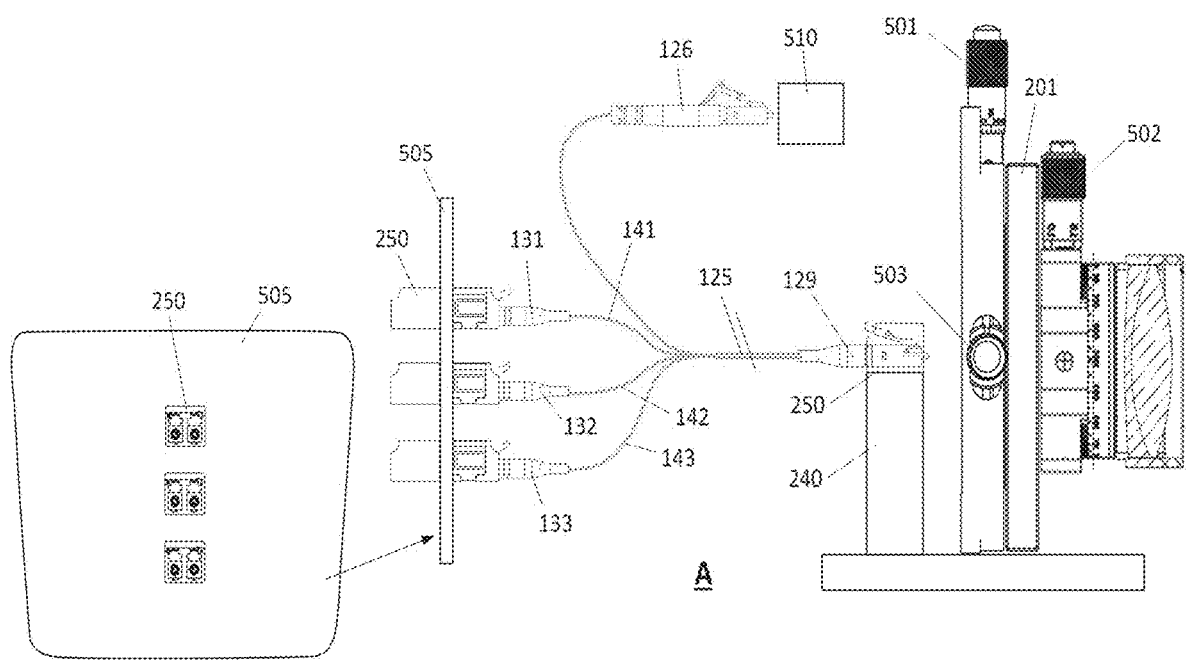
FIG. 13 shows how the optical alignment of two multiple cores can be achieved through the use of two optical subsystems.

Optical communications and alignment of the multiple cores, relative to the optic axis, can be achieved by means of the two optical subsystems A and B shown in FIG. 11. Utilizing the central cores of the two opposing multi-core fibers 103 (FIG. 2), and automated linear positioners 501, 502, and 503, shown below in FIG. 13, the two opposing optical subsystems A and B can be programmed, via control circuit 510, and optical tracking circuitry, not described in this disclosure.

Access to the fiber cores utilized for optical communications can be achieved using fiber pigtails 141, 142, and 143 and connector interfaces 250.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

What is claimed is:

1. A low latency free-space optical data communication channel comprising:

at least two opposing optical collimators for transmitting an optical communication signal in the form of a parallel beam across a free-space channel wherein a collimated light path of the low latency free-space optical data communication channel is enclosed within a channel raceway for carrying fiber optic cables and wherein the input of the collimators are multi-core optical fibers, multiple cores of the multi-core optical fibers are positioned at the focal point of the two opposing optical collimators, and the optical collimators image the communications signals in each of the cores of the multi-core fibers into the corresponding cores of the opposing multi-core fibers at least one of the opposing multi-core fibers comprises a seven core multi-core fiber with one central core and six surrounding cores wherein a lateral alignment of multi-core fibers is achieved using the central core and an angular alignment is achieved using one or more of the six surrounding cores.

2. The low latency free-space optical data communication channel of claim 1, wherein power monitoring for the six surrounding cores is done by tapping into a power of the channel of one of the six surrounding cores by using an optical splitter with less than 30% tapped power.

* * * * *